United States Patent [19]
Morris et al.

[11] Patent Number: 5,960,046
[45] Date of Patent: Sep. 28, 1999

[54] PREAMBLE BASED SELECTION DIVERSITY IN A TIME DIVISION MULTIPLE ACCESS RADIO SYSTEM

[75] Inventors: Bradley John Morris; Brian James Lehman, both of Ottawa; Roland Andrew Smith, Nepean, all of Canada

[73] Assignee: Northern Telecom Limited, Montreal, Canada

[21] Appl. No.: 08/759,813

[22] Filed: Dec. 3, 1996

[51] Int. Cl.$^6$ ....................................................... H04B 7/08
[52] U.S. Cl. ........................... 375/347; 370/337; 370/347
[58] Field of Search .................................. 375/267, 347; 455/133, 277.1, 277.2; 370/252, 342, 347, 350, 320, 321, 335, 337, 441, 442, 498, 522, 503, 509, 511

[56] References Cited

U.S. PATENT DOCUMENTS

| | | | |
|---|---|---|---|
| 4,517,669 | 5/1985 | Freeburg et al. | 370/329 |
| 4,519,068 | 5/1985 | Krebs et al. | 370/329 |
| 4,977,616 | 12/1990 | Linder et al. | 455/277.2 |
| 5,097,484 | 3/1992 | Akaiwa | 375/267 |
| 5,203,024 | 4/1993 | Yamao | 455/133 |
| 5,369,801 | 11/1994 | Smith | 455/277.1 |
| 5,446,922 | 8/1995 | Siwiak et al. | 455/277.2 |
| 5,488,638 | 1/1996 | Kazecki et al. | 375/347 |
| 5,530,926 | 6/1996 | Rozanski | 455/277.2 |
| 5,594,737 | 1/1997 | Pillekamp | 370/278 |
| 5,748,676 | 5/1998 | Mahany | 375/260 |

FOREIGN PATENT DOCUMENTS

| | | |
|---|---|---|
| WO 94/08404 | 4/1994 | WIPO . |
| WO 96/02984 | 2/1996 | WIPO . |
| WO 96/08089 | 3/1996 | WIPO . |

*Primary Examiner*—Young T. Tse

[57] ABSTRACT

A selection diversity system and method for use in a TDMA (time division multiple access) radio system, particularly suited for DECT (Digital Enhanced Cordless Telephone) applications, in which a single receiver makes a performance measurement on each of two antennas in sequence during the beginning of a received data burst, the beginning of the burst being determined by a timing signal fed back from a previous burst. A slicing level used in the receiver to perform threshold detection is continuously improved during the measurements of the two antennas, but held while switching between the antennas. The previously unused antenna is measured first to minimize the likelihood of having to perform two antenna switches.

28 Claims, 7 Drawing Sheets

| | $P_{-1}$ | $P_4$ | $P_5,P_6$ | $P_7,P_8$ | $P_9,P_{10}$ | $P_{11}$......$P_{15}$ |
|---|---|---|---|---|---|---|
| $S_1$ | | CLOSED | OPEN | CLOSED | OPEN IF SWITCH BACK-CLOSED OTHERWISE | CLOSED |

SWITCHING TRANSIENT

POSSIBLE SWITCHING TRANSIENT

FIG. 7c

| | ANT 1 | TRANSIENT | ANT 2 | | |
|---|---|---|---|---|---|
| | $P_0$......$P_4$ | $P_5...P_6$ | $P_7...P_8$ | $P_9...P_{10}$ | $P_{11}$.........$P_{15}$ |
| $S_4$ | CLOSED | OPEN | | | |
| $S_5$ | OPEN | | CLOSED | | |
| $S_6$ | OPEN | | | | CLOSED |

PREAMBLE BASED SELECTION DIVERSITY IN A TIME DIVISION MULTIPLE ACCESS RADIO SYSTEM

FIELD OF THE INVENTION

This invention relates to a method and system for performing selection diversity in a TDMA (time division multiple access) radio system.

BACKGROUND OF THE INVENTION

Cordless telephone TDMA radio systems include a number of fixed base stations and a set of portable handsets (portables). The portables communicate digital data to and from the base stations on TDMA channels. In TDMA, each base station receives data from a given portable in short bursts followed by intervening periods during which no data is received. During the intervening periods, the base station may be communicating with other portables.

It is well known that TDMA radio channels are subject to the impairment of multipath fading. Such fading is statistically independent for a pair of properly spaced antennas at a base station receiver for example. At any instant in time, one of the two antennas may be performing better than the other, and ideally a signal should be received through the better performing antenna. During the period between the reception of bursts on a particular channel, the physical channel between the portable and the base station may change as a result of the movement of the portable itself, or as a result of the movement of some other object. As a result of this, it is possible that the antenna which was better for the previous burst is no longer the better for the current burst. With selection diversity, at the beginning of each burst a decision is made as to which antenna is to be used to receive that entire burst.

Standards exist which stipulate the data structure of a burst. In the DECT (Digital Enhanced Cordless Telecommunications) standard for example, the burst structure includes a set of preamble bits used for timing recovery and a sync word used for slot synchronization. Following this are the information bits. With selection diversity, in order to properly recover the information bits of a given burst, a decision as to which antenna to use for that burst must be made early enough in the reception of the burst that timing and synchronization can still be recovered before the information bits start to arrive.

The most expensive way to make the antenna selection decision is to have two receivers receiving the signal simultaneously, each receiver having one antenna. Performance measurements for the two receivers are made simultaneously and the receiver output which is better is selected.

A much more economical approach is to use a single receiver having two alternatively connectable antennas and to perform both antenna measurements one after the other and then choose the best antenna for the remainder of the signal. Typically, in order to determine which antenna to use, the first antenna is connected early in the reception of the burst and an estimate of the performance is made for that antenna. Then the second antenna is connected and an estimate of the performance is made for that antenna. If the second antenna is performing better than the first antenna then the second antenna is used to receive the burst. Otherwise, the first antenna must be reconnected to receive the remainder of the burst.

A problem with existing TDMA systems is that there is not enough time to make the performance measurements for the two antennas, decide on which antenna to use, recover timing, and recover synchronization before the information bits start to arrive.

Some prior art patents simply neglect to deal with this problem. Published PCT application WO 96/08089 published on Jun. 27, 1995 to Mogensen discloses a selection diversity system for use in a TDMA environment in which the quality of the signal received at the receiver on each of two antenna branches is measured at the beginning of each burst, and the antenna with the better quality is selected. No mention is made of the requirement to recover timing and synchronization. In Mogensen, it is conceded that some of the data will be lost because of the antenna measurements, this lost data being recovered through the use of interleaving and efficient coding. In DECT, interleaving and coding are not used.

Published PCT application WO 96/02984 published on Feb. 1, 1996 to Akerberg discloses a method of selecting a given antenna in a TDMA system by making antenna performance measurements during the preamble period of a DECT TDMA time slot. By using up the preamble bits to make the performance measurements, there is a shortened period during which to recover timing and synchronization. Akerberg does not address the problems of recovering the timing and synchronization of the signal before the arrival of the information bits.

In a modification of the DECT standard, an extended preamble is used which adds 16 extra bits to the beginning of each time slot during which the performance measurements of two antennas can be made. This leaves the normal preamble and sync words available for the recovery of timing and synchronization. A problem with this is that a different data format at the portable must be used, and as such existing portables which do not provide the extended preamble can not be used to provide selection diversity at the base station.

SUMMARY OF THE INVENTION

It is an object of the invention to provide an improved preamble based selection diversity method and apparatus.

According to a first broad aspect, the invention provides an antenna selection system for use in a radio receiver having a plurality of alternatively connectable antenna channels for receiving data bursts each having a preamble, a sync word and a data field, the antenna selection system comprising: a) means for receiving an indication that the sync word has been received in a previous burst; b) timing means for measuring forward in time from reception of the sync word of the previous burst to provide an estimate of the beginning of the preamble of a present burst; c) selection means for controlling which of the plurality of antenna channels is connected and for making performance measurements, the selection means connecting the plurality of antenna channel in turn and making a performance measurement for each antenna channel in turn and after all the performance measurements are made the selection means connecting to the receiver the antenna with the best performance measurement, the first performance measurement being made during a period having a start time related to the estimate of the beginning of the preamble of the present burst.

According to a second broad aspect, the invention provides a TDMA radio receiver for receiving data bursts each having a preamble, a sync word and a data field, the receiver comprising: a) first and second alternatively connectable antenna channels; b) a synchronization circuit which generates a signal when the sync word has been received; c) timing means for measuring forward in time from reception of the sync word of a previous burst to provide an estimate of the beginning of the preamble of a present burst; d) selection means for controlling which antenna channel is connected and for making performance measurements, the selection means connecting the first antenna channel and making a performance measurement for the first antenna channel during a period having a start time related to the estimate of the beginning of the preamble of the present burst, and subsequently connecting the second antenna channel and making a performance measurement for the second antenna channel, the selection means reconnecting the first antenna channel if the first performance measurement is better than the second performance measurement.

According to a third broad aspect, the invention provides an antenna selection method for use in a time division multiple access radio receiver having first and second alternatively connectable antenna channels for receiving data bursts each having a preamble, a sync word and a data field, the antenna selection method comprising the steps of:

a) determining when a sync word for a previous burst has been received; b) measuring forward in time from the reception of the sync word of a previous burst to provide an estimate of the beginning of the preamble of a present burst; c) connecting the first antenna channel; d) measuring a first performance measurement for the first antenna channel during a first time interval having a start time related to the estimate of the beginning of the preamble of the present burst; e) connecting the second antenna channel during a second time interval following said first time interval; f) measuring a second performance measurement for the second antenna channel during a third time interval following said second time interval; g) comparing the first performance measurement and the second performance measurement to determine which performance measurement is better; and h) reconnecting the first antenna channel if the first performance measurement is better.

An advantage of the method and apparatus provided by the invention is that they can be employed at DECT TDMA base stations without the requirement for any modification to the portables.

The use of selection diversity results in the further advantages of enhanced base station coverage and better call quality.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
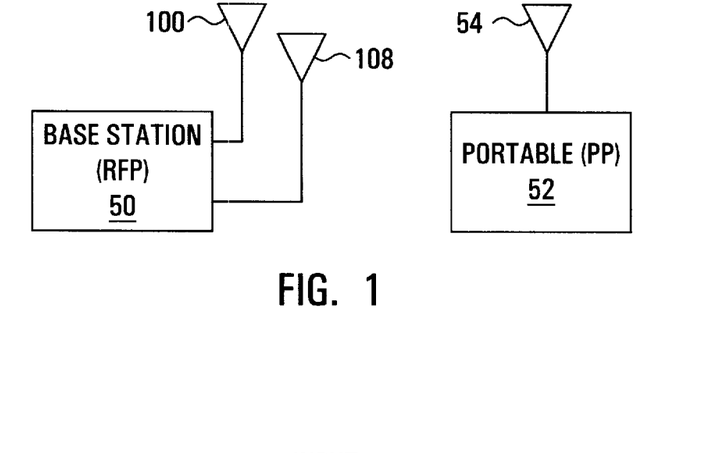
FIG. 1 is a schematic diagram of a cordless telephone system.

FIG. 1 is a very simple schematic of a cordless telephone system. Shown is an RFP (radio fixed part) such as a base station 50 having two antennas 100,108 and a PP (portable or portable part) 52 having an antenna 54. A real system would normally have a large number of base stations and an even larger number of portables. Signals are transmitted from the portable antenna 54 through a multi-path radio channel to the base station antennas 100,108. The signals arriving at the antennas 100,108 suffer attenuation and dispersion due to multipath fading. The physical separation of antennas 100,108 is selected so that the fading characteristics of the two antennas are statistically independent. This means that if the signal arriving at antenna 100 is in a deep fade, there is a significant statistical likelihood that the signal arriving at antenna 108 is relatively strong.

Figure 2:
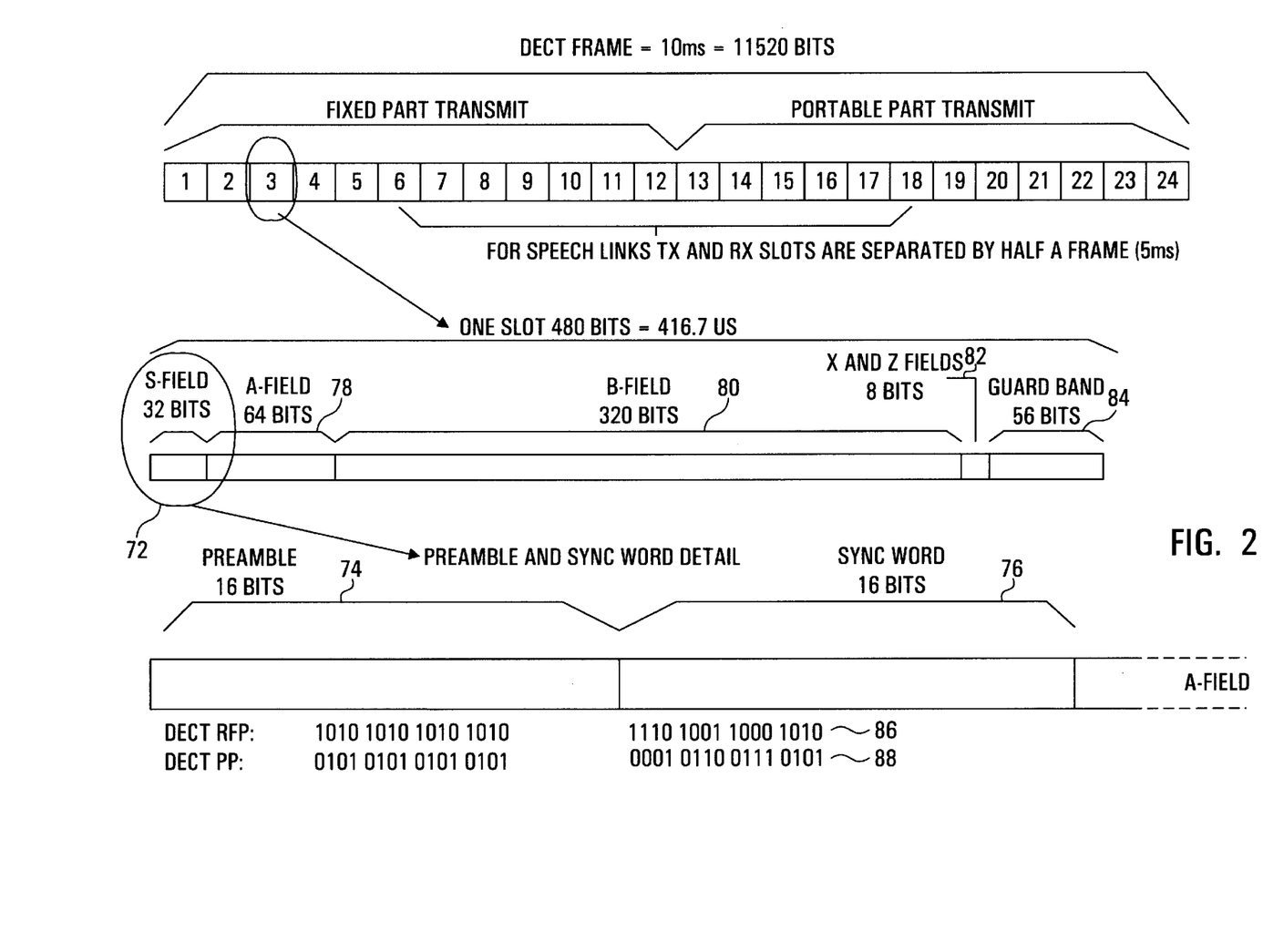
FIG. 2 is an illustration of the DECT TDMA frame and slot structure.

A preferred embodiment of the invention will be described as it may be applied to a DECT system with reference to FIGS. 2 to 8. Referring firstly to FIG. 2, the DECT radio access technology uses a multi-carrier TDMA/TDD (time division duplex) structure. A DECT TDMA frame 70 has a duration of 10 ms and contains 24 full slots numbered 1 to 24. The TDD separation is half a frame (5 ms); thus during slots 1 to 12 the base station is transmitting to the portables, and during slots 13 to 24, the base station is receiving from the portables. One duplex channel is made up of a transmit slot and a receive slot spaced twelve slots (5 ms) later. Also shown is the structure of the data burst contained in each slot. This includes an S-field 72 consisting of a 16 bit preamble 74 normally used for timing recovery and a 16 bit Sync word 76 normally used for synchronization recovery, a 64 bit A-field 78, a 320 bit B-field 80 containing information bits, 8 bits 82 occupying X and Z fields, and a 56 bit guard band 84 which simply separates adjacent slots. The A-field 78 usually includes CRC (cyclic redundancy check) information which can be used to obtain a measurement of the quality of the received burst. The modulation scheme is binary GMSK (Gaussian minimum shift keying) (BT=0.5) with a gross data rate of 1.152 Mbit/s. The allocated frequency band for DECT is 1880–1900 MHz divided into 10 carriers. The transmitted symbols are GMSK (Gaussian minimum shift keying) symbols which consist of two tones nominally spaced in frequency 288 kHz on either side of the carrier frequency of a given channel, the frequency deviation varying with the data sent. Since the system is a binary one, each GMSK symbol carries a single bit of information.

Also shown are the particular bit sequences which make up the S-field according to DECT for the RFP 86 and PP 88.

Figure 3:
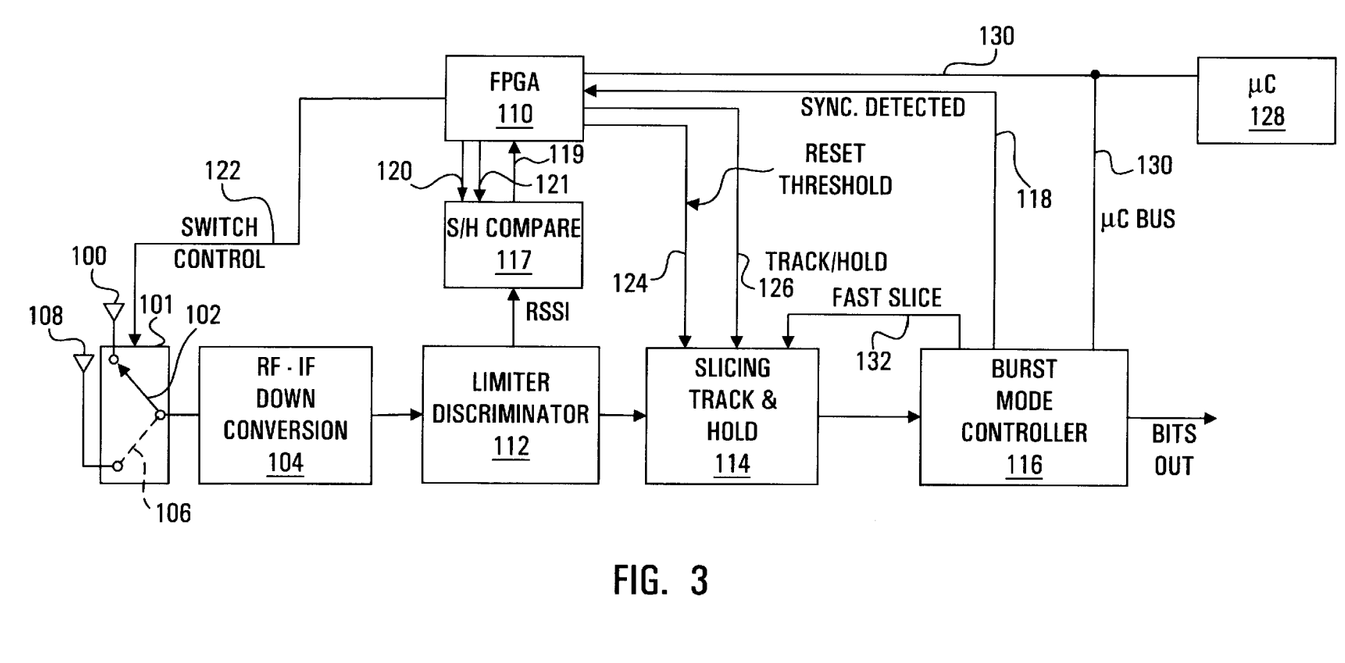
FIG. 3 is a block diagram of a selection diversity receiver according to the invention.

Referring now to FIG. 3, the structure of an analog TDMA base station receiver according to the invention will be described. A first antenna 100 is shown connected through a switch 101 having a first position 102 to the first receiver block 104. The first receiver block 104 is an RF-IF (radio frequency - intermediate frequency) frequency conversion block which performs frequency down conversion and channel filtering. When the switch 101 is in a second position 106, a second antenna 108 is connected to the first block 104. An antenna selection control circuit which may for example be implemented with a FPGA (field programmable gate array) 110 controls through a switch control line 122 the switch 101 connecting the antennas 100,108 to the RF-IF frequency converter block 104 thereby selecting the antenna through which to receive a signal. Following the RF-IF demodulator 104 in sequence is a limiter/discriminator 112, a slicing/track and hold circuit 114 and a BMC (burst mode controller) 116. The FPGA 110 is connected to the limiter/discriminator 112 through an RSSI sample and hold/compare circuit 117. The RSSI sample and hold/compare circuit 117, the slicing/track and hold circuit 114, and the BMC 116 are described in more detail later in this description. A line 119 interconnects the RSSI sample and hold/compare circuit 117 to conduct an RSSI compare output signal generated by the RSSI sample and hold/compare circuit 117 to an input of the FPGA 110. Two lines 120,121 interconnect the FPGA 110 and RSSI sample and hold/compare circuit 117 to conduct two sample/hold control signals generated by the FPGA which control whether the RSSI sample and hold/compare circuit is in sample and hold mode or in compare mode. A line 118 interconnects the BMC 116 and the FPGA 110 to conduct a "SYNC DETECTED" generated by the BMC 116 to an input of the FPGA 110. The switch control line 122 interconnects the FPGA 110 and switch 101, a reset threshold control line 124 and a track/hold control line 126 interconnect the FPGA 110 and the slicing/track and hold circuit 114. The FPGA 110 and BMC 116 are controlled by a microcontroller 128 over a microcontroller bus 130. The BMC 116 controls the slicing rate of the slicing/track and hold circuit 114 through a fast slice control line 132.

Referring again to FIG. 2, while a link between a portable and a base station exists, one of the 24 TDMA slots is assigned for transmission to the portable, and a slot twelve slots after the transmission slot is assigned for reception from the portable. For example, slots 11 and 23 may be assigned as the transmit slot and receive slot respectively. Approximately every 10 ms, another burst arrives at the base station receiver in slot 23 in the next frame. The invention is concerned with the selection of which of the two antennas to use to receive each burst. The base station also uses the previously selected receive antenna to transmit the next burst.

Figure 7A:
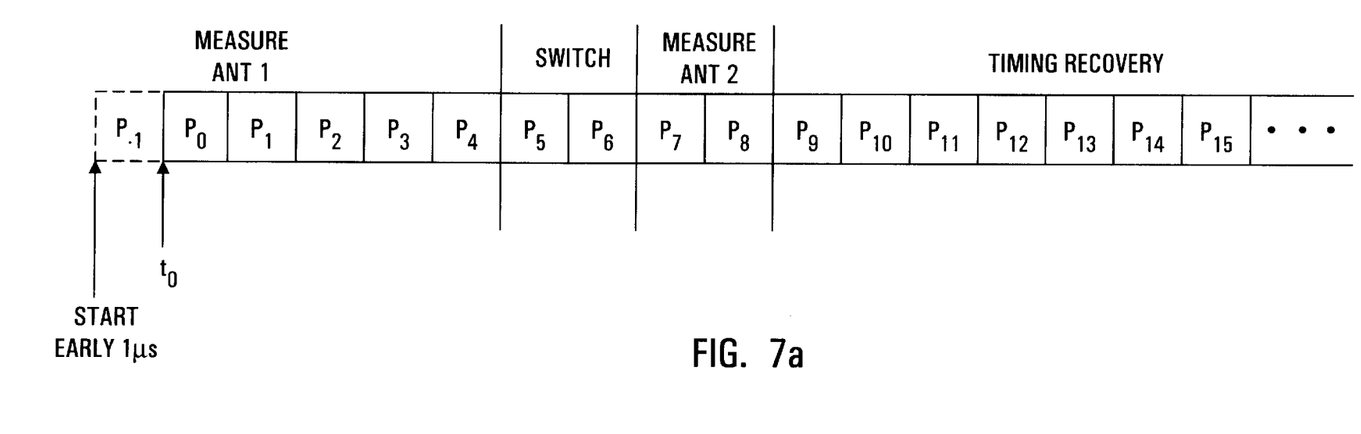
FIGS. 7a and 7b are illustrations of how the preamble bit periods are used to perform selection diversity functions.
Figure 7B:
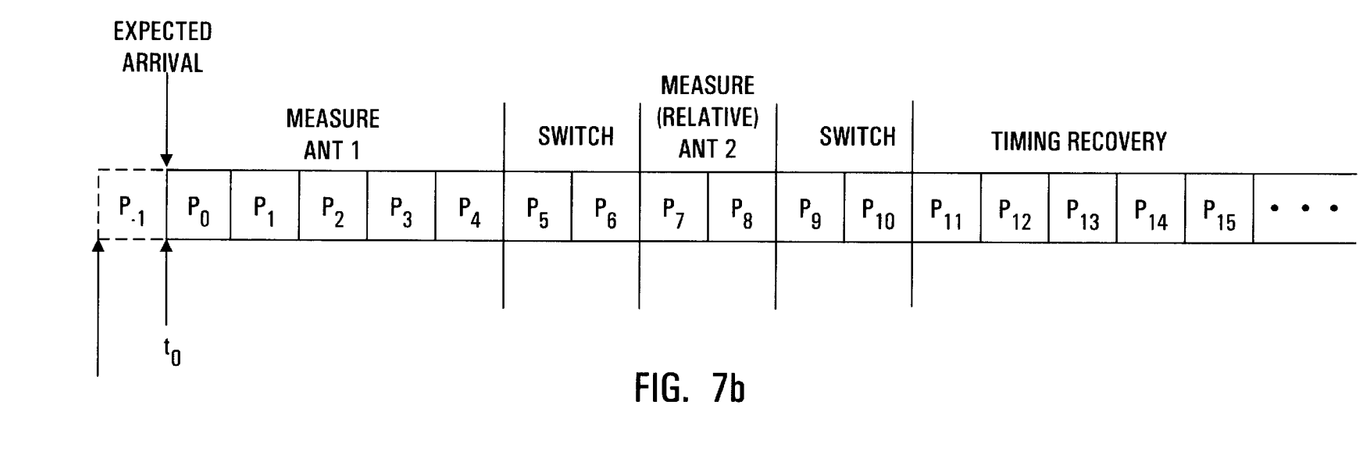

The first GMSK symbols in a DECT burst to arrive at the receiver are the symbols for the preamble bits. The DECT standard constrains the preamble bits to be an alternating sequence of 1's and 0's, this pattern being particularly suitable for timing recovery. FIGS. 7a and 7b illustrate the preamble symbol periods and how they are used during selection diversity according to the invention. Following the preamble is the sync word and then the remainder of the burst. The precise breakdown of the bits in the preamble shown is by way of example only. The exact number of bits used for each function may be changed based upon need and requirement without departing from the scope of the invention.

Figure 4A:
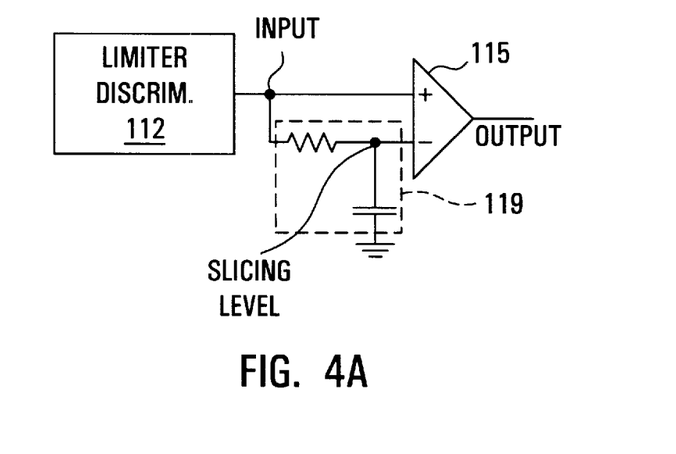
FIG. 4a is a simplified schematic of a slicing circuit.
Figure 4B:
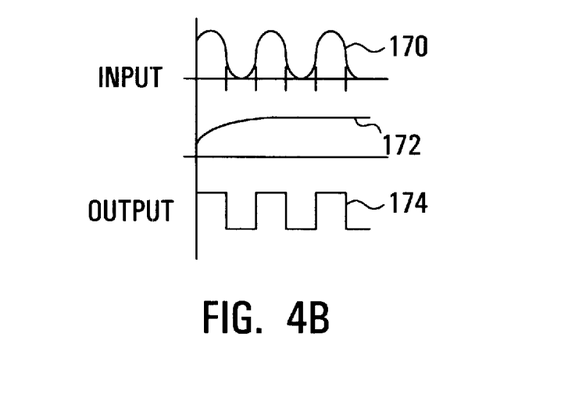
FIG. 4b shows the effect of slicing on an incoming signal.

Assume that the RF carrier frequency of the channel of interest is $F_c$, so that the GMSK tones are nominally located at $F_c-288$ kHz and $F_c+288$ kHz. Due to the tolerance in the base station and portable, the base station transmitted carrier frequency $F_{c,tx,RFP}$ is in the range $F_c \pm 50$ kHz, and the portable transmitted carrier frequency $F_{c,tx,PP}$ is in the range of either $F_c \pm 50$ kHz, or $F_{c,tx,RFP} \pm 50$ kHz. This results in the received carrier frequency at either the portable or base station being accurate to within +/−100 kHz. Received GMSK tones are down converted and filtered in the RF-IF frequency converter 104 and are fed into the limiter/discriminator 112. The limiter amplifies and then clips the received signal to be a constant amplitude (there is no information in the amplitude) and an ideal discriminator produces a voltage characteristic which is linearly related to the input frequency over the frequency range of interest. Thus, the output of the limiter/discriminator 112 is a voltage which is proportional to the intermediate frequency of the received signal. If there were no error in the carrier frequency, then the voltage would be greater than a predetermined voltage for one type of GMSK symbol, and less than the predetermined voltage for another type of GMSK symbol. The slicing circuit continuously converts the output voltage of limiter/discriminator 112 into either a high signal or a low signal on the basis of a threshold referred to as a slicing level. The BMC converts the slicing/track and hold circuit output into a series of bits. The slicing level would be fixed if there were no error in the carrier frequency or offset introduced by other parts of the receiver. One of the things the receiver must do during the reception of the preamble symbols is determine the optimal slicing level which accounts for the error in the carrier frequency. During reception of the preamble symbols, the slicing level is adjusted from zero (or a fixed value) toward the point where it would be midway between the discriminator output voltage amplitudes representative of the two types of GMSK symbols. This is done automatically in the slicing/track and hold circuit 114 by the use of a lowpass filter to extract the DC component of the preamble. Referring to FIG. 4a which is a schematic of a slicing circuit, typically for limiter/discriminator demodulation the slicing circuit includes RC filter 119 and comparator 115. The output of limiter/discriminator 112 is filtered with RC filter 119 to leave only the DC component on one terminal of comparator 115, this being the slicing level. Another terminal of the comparator 115 is connected directly to the unfiltered output of the limiter/discriminator 112. A sample input to the slicing circuit is plotted in curve 170 of FIG. 4b. In curve 172, the output of the RC filter 119, or the slicing level, is plotted as it converges toward the DC value of input signal 170. Curve 174 plots the sliced output of comparator 115. If the input signal (curve 170) is above the slicing level (curve 172), then a high signal is output (curve 174) by the comparator 115. Otherwise a low signal is output (curve 174) by the comparator 115.

Figure 5:
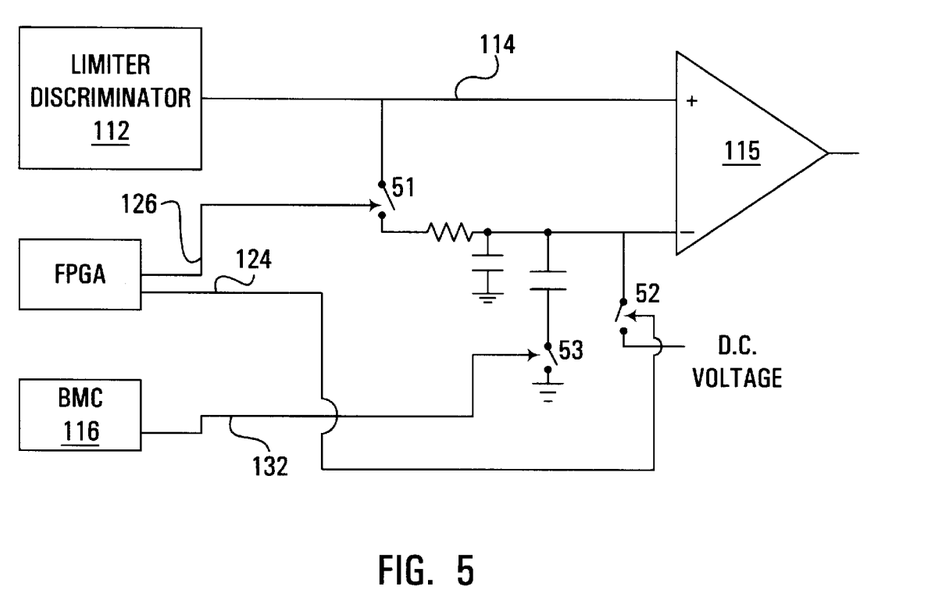
FIG. 5 is a more detailed schematic of the slicing circuit.
Figure 6:
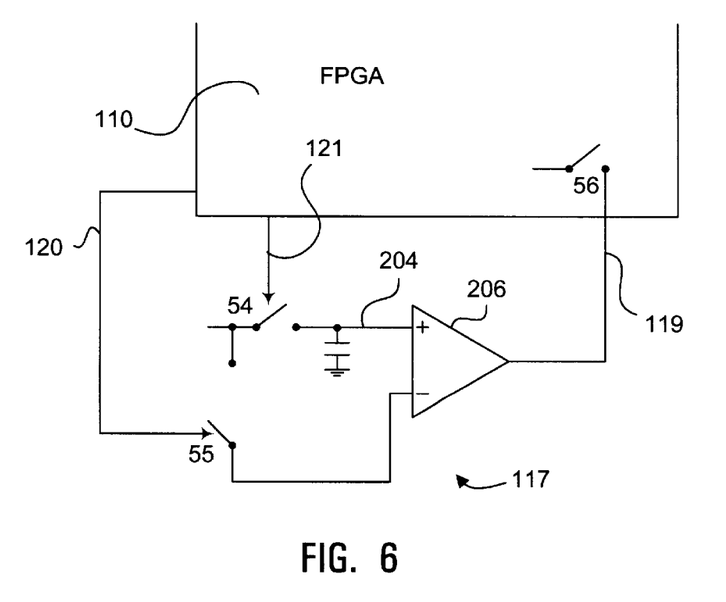
FIG. 6 is a schematic of a circuit used by an FPGA (field programmable gate array) to control RSSI (received signal strength indicator) signal capture.

The slicing/track and hold circuit has four states. These are "fast slice" (used during preamble to quickly find the DC level), "slow slice" (to track the longer term variation of the signal over the duration of a burst), "hold slice" (controlled by the FPGA 110 when switching antennas to minimize disruption of the slicing level due to transients) and "reset slice". "Track Mode" includes either "slow slice" or "fast slice". The timing and use of these four states is controlled by the microcontroller 128, BMC 116 and FPGA 110 as appropriate. Further details of the slicing circuit/track and hold circuit and the signals controlling it are shown in FIG. 5. The FPGA 110 controls a switch S1 through line 126 to determine whether the slicing circuit is in track or hold mode. The FPGA 110 controls a switch S2 through line 124 to enable the "reset slice" state which resets the slicing level to a constant DC voltage. The BMC 116 controls a switch S3 through line 132 to determine whether "fast slice" mode or "slow slice" mode slicing level tracking is being performed. Switch S3 is open during the reception of the preamble. The slicing level is a function of the error in the carrier frequency, and because of this it is not dependent upon which antenna is used. The slicing level is also a function of other factors such as DC offsets in analog components, variations over temperature etc.

During the preamble, a timing circuit (not shown) in the BMC 116 must also recover the timing of the signal. The function of timing recovery is to locate timewise each symbol contained in the received signal. This involves determining the optimal times for the BMC 116 to sample the slicing circuit output voltage.

In order to determine which antenna to use for the burst being received, during the preamble the FPGA 110 enables with control lines 120,121 the capture of an RSSI (received signal strength indication) measurement for the signal received through each antenna in turn, and selects the antenna with the better measurement. How this is achieved will now be described in detail with particular reference to FIG. 3.

The FPGA 110 must first determine when to start measuring the RSSI of the first antenna 100. This is equivalent to making an estimate of when the preamble begins. Although the time between data bursts on a given channel is nominally 10 ms, there is some variation in this value, and the arrival time of the beginning of the preamble is not deterministic. From one burst to the next, a switch to a base station which is a different distance from the portable may have occurred resulting in a delay if the new base station is further away. The portable itself may also have moved. If the beginning of the preamble could be determined exactly, then the entire length of the preamble, namely 14 $\mu$s for DECT, would be available to perform the selection diversity functions and timing recovery. However, a +/−2.0 $\mu$s tolerance must be allotted in the portable, and another +/−2 $\mu$s tolerance for the difference between base stations for a total tolerance of +/−4 $\mu$s. Thus, the start of the preamble is somewhere in the range of $t_o$+/−4.0 $\mu$s as the worst case tolerance required between an individual portable and base station, where $t_o$ is the nominal start time. A given base station supports many portables, 12 in the case of DECT, one for each channel consisting of a transmit and receive slot pair. Effective RSSI measurements do not begin unless there is power, i.e. the burst has started to be received. If the RSSI measurement is started early at $t_o$−4 $\mu$s to catch the beginning of the earliest possible burst, and if a burst actually arrives 4 $\mu$s late at $t_o$+4 $\mu$s then the 8 $\mu$s between $t_o$−4 $\mu$s and $t_o$+4 $\mu$s is spent making an invalid set of measurements, since there is no signal to measure. If instead, the measurement is started 4 $\mu$s late at $t_o$+4 $\mu$s to ensure there is power at the start of the measurement, then if a burst actually arrives 4 $\mu$s early at $t_o$−4 $\mu$s then 8 $\mu$s of the preamble is wasted waiting for the measurement to begin. In either case, only 6 $\mu$s of the 14 $\mu$s preamble remains to perform the two antenna RSSI measurements, any necessary switching, and timing recovery. This is insufficient time to perform all of these functions. To overcome this, a feedback signal on line 118 from the BMC 116 is used. One of the main functions of the BMC 116 is to recover synchronization by scanning the incoming bit sequence for a subsequence which matches a predefined sync word. The purpose of locating the sync word is to determine where in the incoming bit stream the A-field 78 is located. When the BMC 116 locates the sync word, it generates a "SYNC DETECTED" feedback signal on line 118 indicating that synchronization has been achieved. This "SYNC DETECTED" signal indicates the end of the sync word has been received, thereby locating if time the beginning of the A-field 78. The "SYNC DETECTED" signal is fed back to the FPGA 110 on line 118 and is used to make an estimate of the start of the preamble of the next received slot and to thereby determine when to enable the sampling of the RSSI measurements. After the "SYNC DETECTED" signal is received by the FPGA 110 over line 118, the FPGA measures forward in time from the end of the sync word to the beginning of the next burst for the slot of interest contained in the next frame, and begins the first RSSI measurement at the end of the measured time. This amount of time is nominally the length of a frame (10 ms) less the length of the preamble and sync word (28 $\mu$s). Thus it is the SYNC DETECTED signal from the previous burst which is used to determine when to start sampling RSSI measurements on the subsequent burst. This has been found to result in approximately a 0 to ±1 $\mu$s variation or jitter in the start time. So as not to miss the start of the burst this ±1 $\mu$s jitter is accounted for by subtracting 1 $\mu$s from the estimate of the start of the preamble. This does not ensure power at the start of the burst but does guarantee at least 12 $\mu$s to perform the required measurements. Note that the jitter is typically quite stable because the range of movement over 10 ms is small and therefore does not have a large effect upon the timing, so that feedback of sync information from a previous burst is applicable to the present burst. Because the tolerances are stable, it is possible to further reduce burst jitter by calculating the mean value of the jitter (with the microcontroller for example). This may be done by computing the difference between the actual start of the burst and the estimate of the start of the burst and averaging this difference over several bursts. The actual start of the burst would be determined later in the reception of the burst by measuring backwards from the time synchronization is achieved for example. The estimate of the start of the preamble of subsequent bursts can then be improved by adding this mean value to the estimate. This would increase slightly the amount of time to perform the selection diversity functions.

Feedback from the previous burst can only be accomplished if there was a previous burst. To determine when to measure the very first burst, various approaches or diversity modes may be employed while the call is being setup. For example, a particular antenna can be selected for a sequence of bursts until a synchronization signal is generated. In the reception of subsequent bursts, selection diversity can be performed with the BMC feedback as described above. Alternatively, a switching diversity mode may be employed for the reception of the first several bursts to enhance call setup success. The microcontroller is used to setup the diversity mode for each slot in the frame. It does this by setting registers in the FPGA to select the mode of operation. Initially, as described above, the mode might be switching diversity. After the recovery of synchronization, the mode would switch to selection diversity. It is not necessary for the microcontroller to interact with the FPGA on every slot. It only needs to be involved when changes are required to a specific slot's mode of operation.

After an estimate has been made of when the preamble begins, the receiver can proceed with making the RSSI performance measurements. Further details of the RSSI sample and hold/compare circuit 117 will be described with reference to FIG. 6. To start, the FPGA 110 through line 122 instructs switch 101 to connect the first antenna 100 to receiver block 104. During approximately the first six symbol periods of the preamble, (4.5 us), the FPGA 110 through line 121 instructs switch S4 to be closed causing the sample and hold circuit 117 to capture an RSSI measurement for the first antenna 100. The first antenna measurement is started approximately one symbol interval before the estimated start time of the preamble to account for the +/−1 $\mu$s tolerance in the estimate. This ensures that if the burst arrives 1 $\mu$s early, the measurement includes the start of the burst. However, the six symbol intervals allotted for the first antenna may include two empty symbol intervals if the burst actually arrives 1 µs late. This leaves four symbol intervals to perform the measurement, and this is sufficient. During this time, the slicing circuit is in "fast slice" mode and the slicing level in the receiver is continuously converging towards the DC level of the incoming signal. During approximately the next two preamble symbol periods, the FPGA instructs the switch 101 through line 122 to switch to its second switch position 106 so as to connect the second antenna 106 to receiver block 104, and transients are allowed to decay. The slicing circuit is in "hold mode" during the transition between antennas. The slicing level estimate from the first antenna is held during this time by opening S1 with an instruction sent through line 126 from the FPGA 110. During approximately the next two symbol periods, an RSSI measurement is captured for the second antenna 108 by closing switch S5 with an instruction sent over line 120 from the FPGA. Rather than taking six symbol periods to measure an absolute RSSI for the second antenna 108 as was done for the first antenna, all that is required is a measurement over a few symbol periods to determine whether the RSSI of the second antenna is increasing or decreasing with respect to the measurement for the first antenna. The held sample for the first antenna and the sample from the second antenna are each connected to comparator 206. The FPGA closes switch S6 at the end of the second RSSI sampling period to sample the output of comparator 206, and makes a determination of the better antenna. If the output of comparator 206 is greater than zero, then the first antenna is better. Otherwise, the second antenna is better. As soon as this determination is made, a switch back to the first antenna 100 is made only if the first antenna was selected as being better. During the measurement of the RSSI of the second antenna, the estimate of the slicing level obtained from the first antenna is initially used, and then continues to be improved as additional symbols are received. In summary, a very good measurement of the RSSI is made for the first antenna, then it is determined quickly whether the second antenna is better or worse. An analog comparison is made without the requirement for any analog-to-digital conversion of the RSSI measurements. The comparison of the two antenna branches and selection of the better branch can be completed in a total of approximately 11 symbol periods.

During the RSSI measurement on the second antenna, the timing recovery circuit in the BMC 116 starts to recover timing. If no switch back to the first antenna 100 is required, then the period starting from when the first antenna switch is performed up until the end of the preamble is available for timing recovery. This amounts to at least approximately seven symbol periods of the preamble (6.08 µs). If a second switch back to the first antenna is required, then it takes two symbol periods to switch back, leaving at least approximately five symbol periods (4.34 µs) left of the 16 bit preamble to perform timing recovery before the sync symbols start to arrive. This has been found to be a sufficient length of time to recover timing.

As can be seen above, it is advantageous to avoid having to switch back from the second antenna to the first antenna because much less time is available for timing recovery in this case. There is a statistical likelihood that the antenna selected to receive the previous burst will also be the better antenna for the subsequent burst. In order to minimize the number of switch backs, the FPGA always makes the first RSSI measurement on the previously unused antenna, and makes the second RSSI measurement on the previously used antenna, thereby reducing the probability of having to switch back to the first antenna after measuring the other antenna.

Figure 7C:
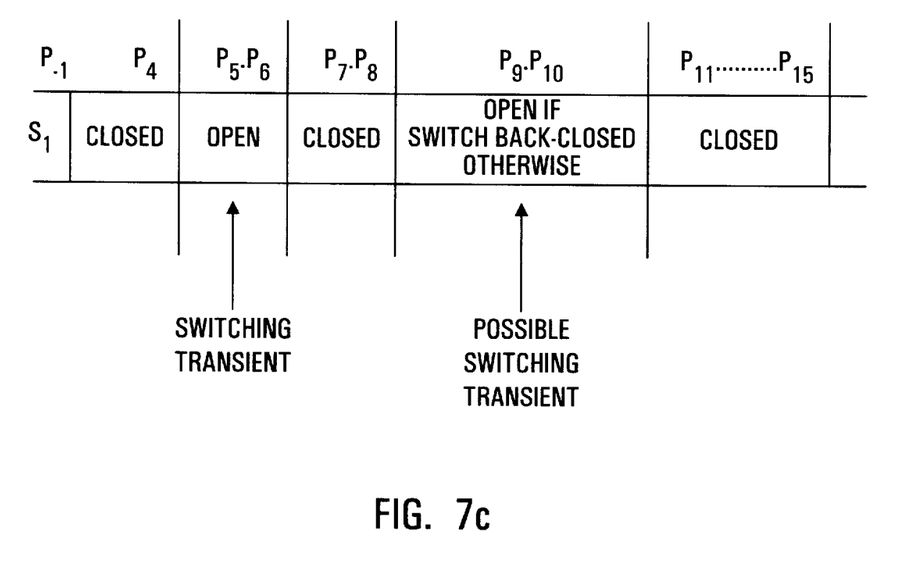
FIG. 7c illustrates the state of switch S1 of FIG. 5 during the preamble.
Figure 7D:
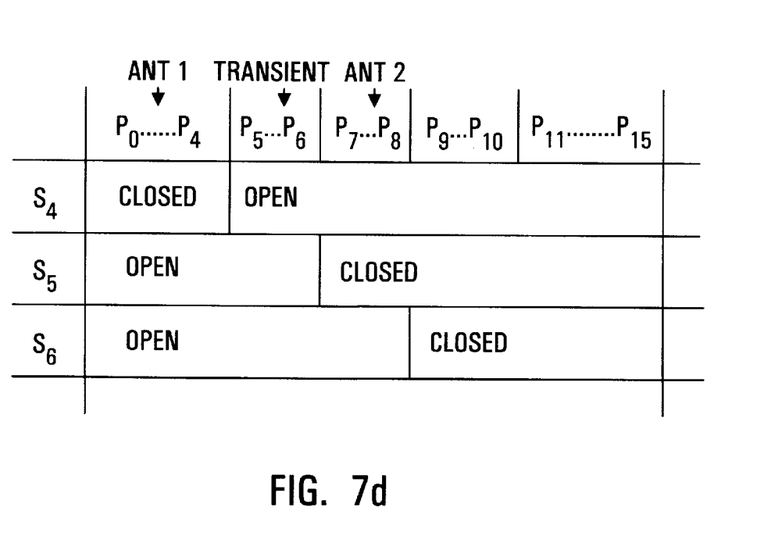
FIG. 7d shows the state of slicing level track/hold switches S4, S5, S6 of FIG. 6 during the preamble.

FIG. 7a summarizes when the RSSI measurements and switches are performed for the case in which the first measured antenna has the better performance. The measurements started up to 1 µs early to ensure that the start of the burst is included. In this example, the estimate of the start of the preamble including the 1 µs early head start is 1 µs before the start of the burst. The period during the 1 µs headstart is labelled as p−1. The sixteen symbol periods of the preamble are labelled p0 to p15. During p−1 to p4, an absolute RSSI measurement for the first antenna is made. During p5,p6 a switch to the second antenna is made. During p7 to p8, a relative RSSI measurement for the second antenna is made. At the end of this time, the better performing antenna is selected to receive the burst. In this example, the first antenna has the better RSSI measurement, and a switch back to the first antenna during p9,p10 is made. Timing recovery is performed on the signal received through the first antenna during the remaining period consisting of p11 to p15. The state of switch S1 during the various preamble bit periods is shown in FIG. 7c. The states of switches S4, S5, and S6 during the preamble are shown in FIG. 7d.

FIG. 7b summarizes when the RSSI measurements and switches are performed for the case in which the second antenna has the better performance. During p−1 to p4, an absolute RSSI measurement for the first antenna is made. During p5,p6 a switch to the second antenna is made. During p7 to p8, a relative RSSI measurement for the second antenna is made. At the end of this time, the better performing antenna is selected to receive the burst. In this example, the second antenna has the better RSSI measurement, so no switch back to the first antenna is required. During p9 to p15, timing recovery is performed on the signal received through the second antenna.

Software running on the microcontroller 122 may be equipped with an override function which allows the microcontroller to select an antenna based upon some other criterion such as link quality information, such as during call setup where the antenna selection system disables antenna switching. It is known that the RSSI based diversity method described above will in general be sufficient to improve system performance; however, it is also known that certain environments exist which are highly dispersive in nature. In these environments, the only simple means of determining the better antenna is to revert back to an algorithm which uses additional information about the link quality such as CRC information which may indicate that the antenna with the stronger RSSI is not necessarily the better.

Figure 8:
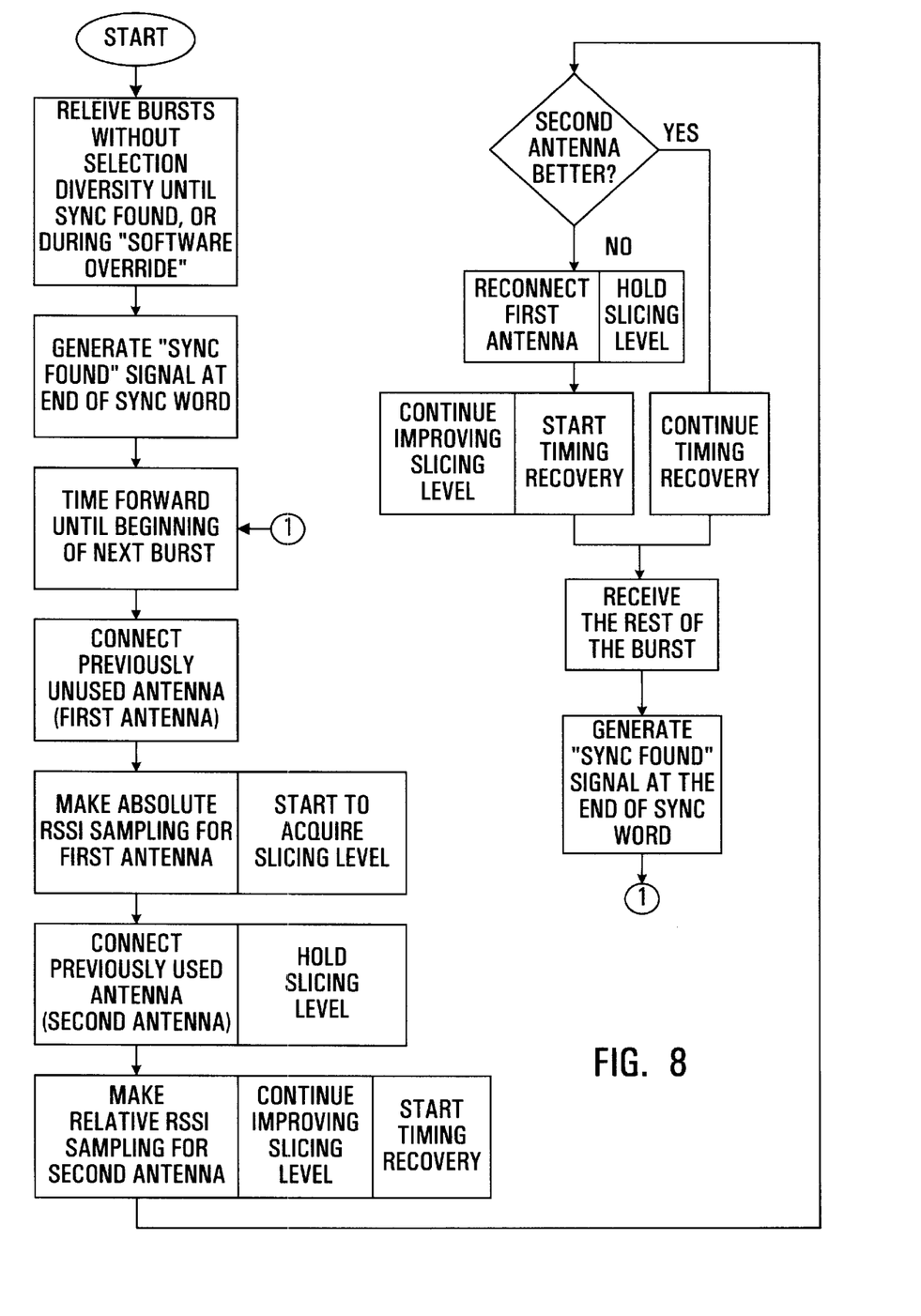
FIG. 8 is a flow chart for a selection diversity algorithm according to the invention.

The above described method of performing antenna selection diversity is summarized in FIG. 8 which shows an algorithm flowchart.

The selection diversity method has been described with reference to a single slot of a DECT TDMA frame. In the DECT TDMA case, the FPGA can handle up to twelve simultaneous calls. The FPGA needs enough memory and registers to keep track of the different sync offsets, modes of diversity etc. for each of the twelve calls.

Numerous modifications and variations of the present invention are possible in light of the above teachings. It is therefore to be understood that within the scope of the appended claims, the invention may be practised otherwise than as specifically described herein.

The example described above provides a method and apparatus for performing selection diversity at the base station. The same selection diversity may also be employed at the portables instead, or at both the portables and the base stations. Of course, a modified portable design would be required to perform the selection diversity at the portables.

The DECT standard allows transmit power to ramp-up as early as 10 μs prior to the first bit of the preamble. Depending on how the portable manufacturer uses this specification, it is possible that it may be effectively used as a "hidden" extension of the preamble. This would allow more time to perform the selection diversity. The use of this "hidden" extension of the preamble further enhances the performance by allowing additional time for RSSI measurements and clock recovery. All portables contain a finite amount of power ramp-up time prior to the first bit transmitted to ensure they are at full power for the first bit of the preamble. Utilization of this power ramp-up time to perform diversity functions at the base station would require that the portables be qualified for use with specific base station products. Alternatively, the FPGA in combination with the microcontroller could control RSSI measurements earlier than predicted by the "Sync Found" to iteratively determine the power ramp profile of the portable and then adjust the diversity timing to take advantage of any early power up. This would be done prior to selection diversity as part of the call setup procedure but after slot synchronization has been initially detected.

In the above described embodiment, a particular type of analog demodulation is performed between the steps of RSSI measurement and SYNC WORD detection. More generally, any type of demodulation which recovers an estimate of the transmitted symbols may be used. For example, other types of analog demodulation or digital demodulation may be used.

In the above description, two or more spaced antennas are used at the input to achieve spatial diversity, and the invention has provided methods and systems for selecting which of the spaced antennas to use. The invention can also be applied to other forms of diversity. For example, to achieve two-fold diversity, two antennas having orthogonal polarizations may be used or a single antenna having two selectable antenna channels with orthogonal polarizations may be used. In general, the invention provides methods and systems for selecting which of several possible antenna channels to use to receive a burst, and this is independent of the particular antenna scheme used. When two or more antennas are referred to, this is not intended to exclude two or more antenna channels implemented with a single physical apparatus.

No extended preamble is required to implement the above describe embodiments of the invention, but if an extended preamble is available, it could be utilized to enhance timing recovery, slicing level estimation, and antenna performance measurements thereby improving the overall burst receive performance.

We claim:

1. An antenna selection system for use in a radio receiver having a plurality of alternatively connectable antenna channels for receiving data bursts each having a preamble, a sync word and a data field, the antenna selection system comprising:
    a) means for receiving an indication that the sync word has been received in a previous burst;
    b) timing means for measuring forward in time from reception of the sync word of the previous burst to provide an estimate of the beginning of the preamble of a present burst;
    c) selection means for controlling which of the plurality of antenna channels is connected and for making performance measurements, the selection means connecting the plurality of antenna channels in turn and making a performance measurement for each antenna channel and after all the performance measurements are made the selection means connecting to the receiver the antenna channel with the best performance measurement, the first performance measurement being made during a period having a start time related to the estimate of the beginning of the preamble of the present burst.

2. The antenna selection system of claim 1, wherein each of said antenna channels is part of a separate antenna.

3. The antenna selection system of claim 1 wherein said antenna channels are part of a single antenna apparatus.

4. The antenna selection system of claim 1 wherein said plurality of antenna channels comprise two physically spaced antennas.

5. The antenna selection system of claim 1 wherein said plurality of antenna channels comprise two orthogonally polarized antenna channels.

6. An antenna selection system for use in a time division multiple access radio receiver having first and second alternatively connectable antenna channels for receiving data bursts each having a preamble, a sync word and a data field, the antenna selection system comprising:
    a) means for receiving an indication that the sync word has been received in a previous burst;
    b) timing means for measuring forward in time from reception of the sync word of the previous burst to provide an estimate of the beginning of the preamble of a present burst;
    c) selection means for controlling which antenna channel is connected and for making performance measurements, the selection means connecting the first antenna channel and making a performance measurement for the first antenna channel during a period having a start time related to the estimate of the beginning of the preamble of the present burst, and subsequently connecting the second antenna channel and making a performance measurement for the second antenna channel, the selection means reconnecting the first antenna channel if the first performance measurement is better than the second performance measurement.

7. The antenna selection system of claim 6 wherein each performance measurement is an analog RSSI (received signal strength indicator) measurement.

8. The antenna selection system of claim 6 wherein each performance measurement is an analog RSSI measurement combined with a cyclic redundancy check (CRC) link quality measurement.

9. The antenna selection system of claim 6 wherein the antenna selected to receive a burst is also used to transmit a subsequent burst.

10. The antenna selection system of claim 6 wherein only a relative performance measurement for the second antenna channel is determined, the selection means reconnecting the first antenna channel if the performance measurement of the second antenna channel is decreasing with respect to that of the first antenna channel.

11. The antenna selection system of claim 6 wherein the second antenna channel is the antenna channel last connected during the previous burst.

12. A TDMA radio receiver for receiving data bursts each having a preamble, a sync word and a data field, the receiver comprising:
    a) first and second alternatively connectable antenna channels;
    b) a synchronization circuit which generates a signal when the sync word has been received;

c) timing means for measuring forward in time from reception of the sync word of a previous burst to provide an estimate of the beginning of the preamble of a present burst;

d) selection means for controlling which antenna channel is connected and for making performance measurements, the selection means connecting the first antenna channel and making a performance measurement for the first antenna channel during a period having a start time related to the estimate of the beginning of the preamble of the present burst, and subsequently connecting the second antenna channel and making a performance measurement for the second antenna channel, the selection means reconnecting the first antenna channel if the first performance measurement is better than the second performance measurement.

13. The TDMA receiver according to claim 12 wherein the first and second antenna channels are two physically spaced antennas.

14. The TDMA receiver according to claim 12 wherein the first and second antenna channels have orthogonal polarization.

15. The TDMA receiver of claim 12 wherein each performance measurement is an analog RSSI (received signal strength indicator) measurement.

16. The TDMA receiver of claim 12 wherein only a relative performance measurement for the second antenna channel is determined, the selection means reconnecting the first antenna channel if the performance measurement of the second antenna channel is decreasing with respect to that of the first antenna channel.

17. The TDMA receiver of claim 12 wherein the second antenna channel is the antenna channel last connected during the previous burst.

18. The TDMA receiver of claim 12 further comprising timing recovery means which performs timing recovery during reception of the preamble.

19. The TDMA receiver of claim 18 wherein said timing recovery means performs timing recovery starting with the measurement of the performance measurement of the second antenna.

20. The TDMA receiver of claim 12 further comprising:
analog demodulating means, the analog demodulating means having a data slicer with a slicing level; and
slicing level adjustment means for improving the slicing level towards an optimal value during the first performance measurement, holding the slicing level for a brief period during and following the connection of the second antenna channel, and improving further the slicing level during the second performance measurement.

21. An antenna selection method for use in a time division multiple access radio receiver having first and second alternatively connectable antenna channels for receiving data bursts each having a preamble, a sync word and a data field, the antenna selection method comprising the steps of:

a) determining when the sync word for the previous burst has been received;

b) measuring forward in time from the reception of the sync word of a previous burst to provide an estimate of the beginning of the preamble of a present burst;

c) connecting the first antenna channel;

d) measuring a first performance measurement for the first antenna channel during a first time interval having a start time related to the estimate of the beginning of the preamble of the present burst;

e) connecting the second antenna channel during a second time interval following said first time interval;

f) measuring a second performance measurement for the second antenna channel during a third time interval following said second time interval;

g) comparing the first performance measurement and the second performance measurement to determine which performance measurement is better; and h) reconnecting the first antenna channel if the first performance measurement is better.

22. The method of claim 21 wherein each performance measurement is an analog RSSI (received signal strength indicator) measurement.

23. The method of claim 21 wherein only a relative performance measurement for the second antenna channel is determined during step f), and wherein during step g) it is determined that the first performance measurement is better if the performance measurement of the second antenna channel is decreasing with respect to that of the first antenna channel.

24. The method of claim 21 wherein the second antenna channel is the antenna channel last connected during the previous burst.

25. The method of claim 21 further comprising the step of:
performing timing recovery during reception of the preamble.

26. The method of claim 25 wherein said timing recovery is performed starting after the connection of the second antenna channel.

27. The method of claim 21 further comprising the steps of improving a slicing level during the first time interval, holding the slicing level during the second time interval, and further improving the slicing level during the third time interval.

28. The method of claim 21 further comprising the steps of:
calculating a jitter value consisting of the difference between the actual beginning of the preamble and the estimate of the beginning of the preamble;
calculating a mean of the jitter value over a plurality of bursts;
adding the mean of the jitter value to the estimate of the start time of the preamble of a subsequent burst.

* * * * *